US011287000B2

(12) United States Patent
Sasaki et al.

(10) Patent No.: US 11,287,000 B2
(45) Date of Patent: Mar. 29, 2022

(54) VEHICULAR DISC BRAKE (71) Applicant: NISSIN KOGYO CO., LTD., Tomi (JP)

(72) Inventors: Yuki Sasaki, Tomi (JP); Toshihiro Tezuka, Tomi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 15 days.

(21) Appl. No.: 16/644,617

(22) PCT Filed: Jul. 25, 2018

(86) PCT No.: PCT/JP2018/027829
§ 371 (c)(1),
(2) Date: Mar. 5, 2020

(87) PCT Pub. No.: WO2019/049539
PCT Pub. Date: Mar. 14, 2019

(65) Prior Publication Data
US 2021/0079968 A1    Mar. 18, 2021

(30) Foreign Application Priority Data
Sep. 7, 2017    (JP) .............................. JP2017-172058

(51) Int. Cl.
*F16D 65/40*    (2006.01)
*F16D 65/097*    (2006.01)
(Continued)

(52) U.S. Cl.
CPC ....... *F16D 65/0977* (2013.01); *F16D 55/228* (2013.01); *F16D 65/0068* (2013.01); *F16D 2055/0016* (2013.01)

(58) Field of Classification Search
CPC ................. F16D 55/224; F16D 55/227; F16D 65/0972–0975; F16D 65/40
(Continued)

(56) References Cited

U.S. PATENT DOCUMENTS 5,310,024 A    5/1994 Takagi
6,527,090 B1 *    3/2003 Barillot ............... F16D 65/0972
                                                         188/73.1
(Continued)

FOREIGN PATENT DOCUMENTS

CN    102705404 A    10/2012
JP    2552633 Y2    10/1997
(Continued)

OTHER PUBLICATIONS

International Search Report dated Oct. 30, 2018, issued in counterpart International Application No. PCT/JP2018/027829 (2 pages).
(Continued)

*Primary Examiner* — Christopher P Schwartz
(74) *Attorney, Agent, or Firm* — Westerman, Hattori, Daniels & Adrian, LLP (57) ABSTRACT

This vehicular disc brake in which a pad spring can be preferably attached while a caliper body is downsized and lightened, is provided with: a turn-in side pad spring provided with a turn-in side resilient portion a that is attached on a disc turn-in side relative to a friction pad accommodating portion of a bridge portion and that biases a friction pad to a disc radial inner side and a disc turn-out side, and a turn-in side retainer portion laid on a turn-in side torque reception stepped portion m; and a turn-out side pad spring provided with a turn-out side resilient portion that is attached on a disc turn-out side relative to the friction pad accommodating portion of the bridge portion 3c and that biases the friction pad to the disc radial inner side, and a
(Continued)

turn-out side retainer portion laid on a turn-out side torque reception stepped portion.

3 Claims, 4 Drawing Sheets (51) Int. Cl.
    *F16D 55/228*     (2006.01)
    *F16D 65/00*     (2006.01)
    *F16D 55/00*     (2006.01)

(58) Field of Classification Search
    USPC .......................................... 188/73, 36–73.38
    See application file for complete search history.

(56) References Cited

U.S. PATENT DOCUMENTS

| | | | |
|---|---|---|---|
| 8,393,441 B2* | 3/2013 | Gutelius | F16D 65/0975 188/73.38 |
| 8,469,159 B2* | 6/2013 | Lowe | F16D 55/227 188/73.1 |
| 2006/0070828 A1 | 4/2006 | Hendrich et al. | |
| 2012/0222925 A1 | 9/2012 | Kaneko | |
| 2014/0251737 A1 | 9/2014 | Nanri | |

FOREIGN PATENT DOCUMENTS

| | | |
|---|---|---|
| JP | 2005-533987 A | 11/2005 |
| JP | 2006-194312 A | 7/2006 |
| JP | 2014-173622 A | 9/2014 |
| JP | 2016-50601 A | 4/2016 |

OTHER PUBLICATIONS

Office Action dated Jan. 5, 2021, issued in counterpart JP Application No. 2019-540814, with English Translation. (7 pages).

Office Action dated Sep. 16, 2020, issued in counterpart CN Application No. 201880047118.6, with English Translation. (12 pages).

Extended (Supplementary) European Search Report dated Feb. 11, 2021, issued in counterpart EP Application No. 18854384.7. (5 pages).

* cited by examiner

VEHICULAR DISC BRAKE

TECHNICAL FIELD

The present invention relates to a vehicular disk brake, more particularly to a vehicular disk brake in which a pad spring for suppressing the rattling of friction pads is disposed between a bridge portion of a caliper body and the friction pads.

BACKGROUND ART

In some conventional vehicular disk brakes, the rattling of friction pads is suppressed by attaching a pad spring to the disc radial inner side surface of the middle portion in the disc circumferential direction of a bridge portion and bringing a resilient portion of the pad spring into contact with the disk radial outer surfaces of the friction pads (see, for example, PTL 1).

CITATION LIST

Patent Literature

PTL 1: JP-A-2014-173622

SUMMARY OF INVENTION

Technical Problem

However, since the pad spring is attached to the disk radial inner side surface of the middle portion in the disk circumferential direction of the bridge portion in PTL 1, a predetermined clearance needs to be provided between the bridge portion and the friction pads to ensure a resilient force of the pad spring, there is a risk that the size of the caliper body is increased. In addition, the middle portion in the disk circumferential direction of the bridge portion is formed thick to ensure the rigidity of the middle portion in the disk circumferential direction of the bridge portion to which the pad spring is attached, thereby causing a risk of hindering the lightening of the caliper body.

Therefore, an object of the invention is to provide a vehicular disc brake in which a pad spring can be attached preferably while downsizing and lightening the caliper body.

Solution to Problem

To achieve the above object, according to the invention, there is provided a vehicular disc brake in which a caliper body is formed by connecting, via a bridge portion straddling an outer periphery of a disc rotor, a pair of action portions facing each other with the disc rotor sandwiched therebetween, the action portions are provided with a pair of friction pads accommodating portions that accommodates a pair of friction pads disposed with the disc rotor sandwiched therebetween, ear pieces project on a disc turn-in side and a disc turn-out side in vehicle forward movement on a disc radial outer side of each of the friction pads, and torque reception stepped portions are formed on the disc radial outer side of each of the friction pad accommodating portions, the torque reception stepped portions supporting the ear pieces so that the ear pieces are movable in a disc shaft direction, the vehicular disc brake further including a turn-in side pad spring that has a turn-in side resilient portion attached to a part of the bridge portion on the disc turn-in side in vehicle forward movement of the friction pad accommodating portions, the turn-in side resilient portion biasing the friction pads to a disc radial inner side and the disc turn-out side, and a turn-in side retainer portion laid on one of the torque reception stepped portions on the disc turn-in side; and a turn-out side pad spring that has a turn-out side resilient portion attached to a part of the bridge portion on the disc turn-out side in vehicle forward movement of the friction pad accommodating portions, the turn-out side resilient portion biasing the friction pads to the disc radial inner side, and a turn-out side retainer portion laid on the other of the torque reception stepped portions on the disc turn-out side.

In addition, preferably, each of the friction pads has a pair of projecting pieces projecting toward the disc radial outer side on a disc radial outer surface, the friction pads being formed symmetrically with respect to a center line extending in a disc radial direction, the turn-in side resilient portion has a turn-in side attachment portion to be attached to a disc radial inner side surface of the bridge portion, a turn-in side extending piece extending to the disc radial outer side of the friction pads from the turn-in side attachment portion, and a turn-in side resilient piece that is folded toward the friction pads via a curved portion from a projecting end portion of the turn-in side extending piece and has an end portion in contact with disc turn-in side surfaces of the projecting pieces on the disc turn-in side, and the turn-out side resilient portion has a turn-out side attachment portion to be attached to the disc radial inner side surface of the bridge portion, a turn-out side extending piece extending to the disc radial outer side of the friction pads from the turn-out side attachment portion, and a turn-out side resilient piece that is folded toward the friction pads via a curved portion from a projecting end portion of the turn-out side extending piece and has an end portion in contact with the disc radial outer side surfaces of the friction pads.

In addition, preferably, the bridge portion is provided with the ceiling opening, the friction pad accommodating portions are formed on the disc radial inner side of the ceiling opening, the turn-in side pad spring has a turn-in side holding piece that makes contact with a disc turn-in side surface of the ceiling opening and extends to the disc radial outer side of the turn-in side resilient portion and the turn-in side retainer portion is formed on the disc radial inner side of the turn-in side holding piece, and the turn-out side pad spring has a turn-out side holding piece that makes contact with a disc turn-out side surface of the ceiling opening and extends to the disc radial outer side of the turn-out side resilient portion and the turn-out side retainer portion is formed on the disc radial inner side of the turn-out side holding piece.

Advantageous Effects of Invention

Since the turn-in side pad spring is attached to a part of the bridge portion of the caliper body on the disc turn-in side in vehicle forward movement of the friction pad accommodating portions and the turn-out side pad spring is attached to a part of the bridge portion on the disc turn-out side in vehicle forward movement of the friction pad accommodating portions in vehicular disc brake according to the invention, a clearance for ensuring a resilient force of the pad spring does not need to be provided between the bridge portion and the friction pads and the caliper body can be downsized. In addition, since it is not necessary to form the bridge portion thick to attach the turn-in side pad spring and the turn-out side pad spring, there is no risk that the weight of the caliper body is increased.

Furthermore, the pair of projecting pieces projecting toward the disc radial outer side are formed on the friction pads, the friction pads are formed symmetrically with respect to the center line extending in the disc radial direction, the turn-in side resilient portion of the turn-in side pad spring has the turn-in side attachment portion, the turn-in side extending piece, and the turn-in side resilient piece that is folded toward the friction pads via the curved portion from the projecting end portion of the turn-in side extending piece and has the end portion in contact with disc turn-in side surfaces of the projecting pieces on the disc turn-in side, and the turn-out side resilient portion of the turn-out side pad spring has the turn-out side attachment portion, the turn-out side extending piece, and the turn-out side resilient piece that is folded toward the friction pads via the curved portion from the projecting end portion of the turn-out side extending piece and has the end portion in contact with the disc radial outer side surfaces of the friction pads. Accordingly, the pair of friction pads can be formed in the same shape, thereby achieving cost reduction.

In addition, the bridge portion is provided with a ceiling opening, the friction pad accommodating portions are formed on the disc radial inner side of the ceiling opening, the turn-in side pad spring has a turn-in side holding piece that makes contact with a disc turn-in side surface of the ceiling opening and extends to the disc radial outer side of the turn-in side resilient portion, and the turn-out side pad spring has a turn-out side holding piece that makes contact with a disc turn-out side surface of the ceiling opening and extends to the disc radial outer side of the turn-out side resilient piece. Accordingly, when the turn-in side pad spring, the turn-out side pad spring, and the friction pads are assembled to the caliper body, the turn-in side holding piece and the turn-out side holding piece can stably hold the turn-in side pad spring and the turn-out side pad spring, thereby improving assemblability.

DESCRIPTION OF EMBODIMENTS

FIG. 1 to FIG. 4 illustrate a vehicular disc brake according to an embodiment of the invention. It should be noted here that arrow A represents the rotational direction of a disc rotor that rotates together with a wheel when the vehicle moves forward and a disc turn-out side and a disc turn-in side described below assume that the vehicle moves forward.

A vehicular disc brake 1 according to the embodiment includes a disc rotor 2 that rotates together with a wheel, a caliper body 3 attached to a vehicle body in one side portion of the disc rotor 2, friction pads 4 and 4 disposed facing each other with the disc rotor 2 sandwiched therebetween between action portions 3a and 3a of the caliper body 3 disposed in both side portions of the disc rotor 2, a turn-in side pad spring 5 biasing the friction pads 4 and 4 toward the disc radial inner side and the disc turn-out side, and a turn-out side pad spring 6 biasing the friction pads 4 toward the disc radial inner side.

Figure 1:
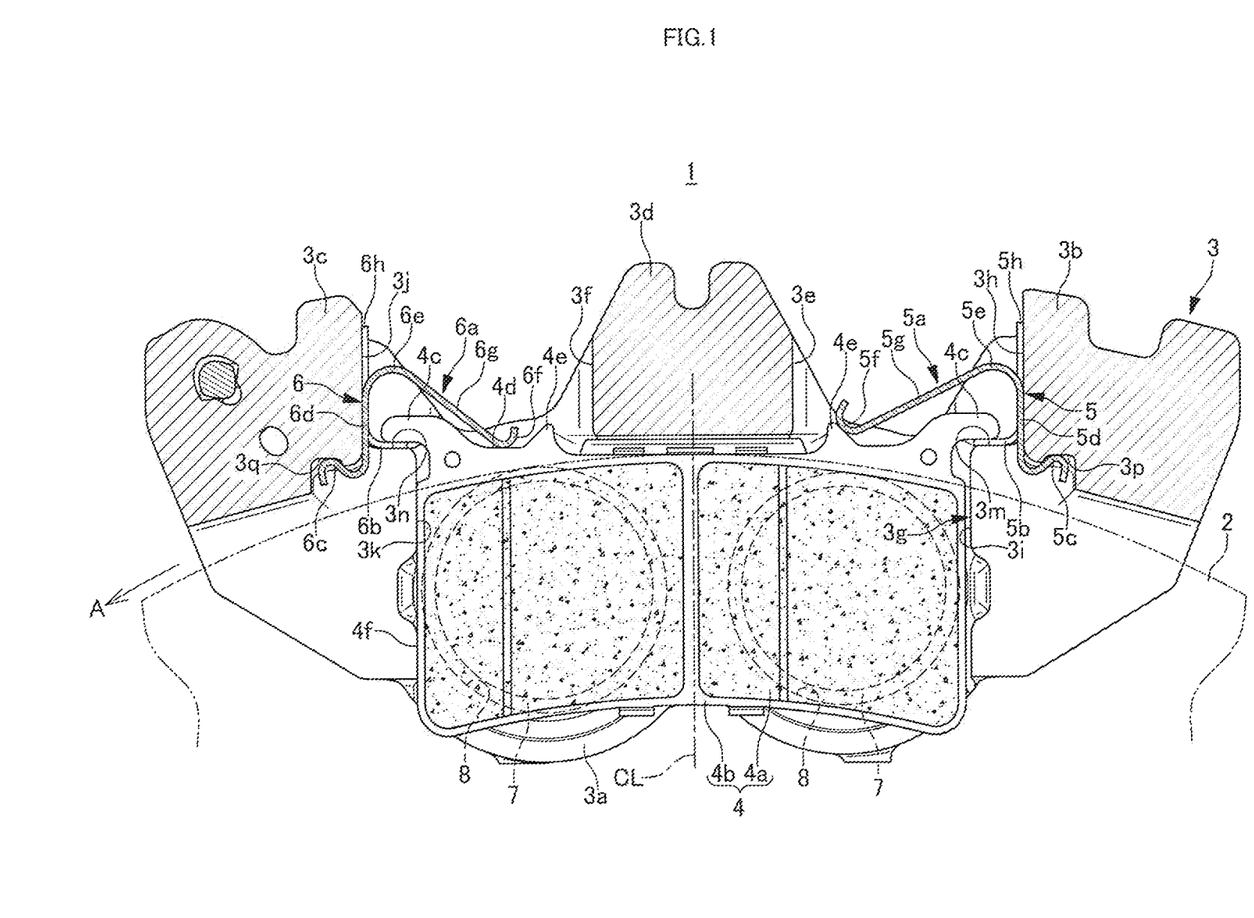
FIG. 1 is a cross sectional view taken along line I-I in FIG. 2.
Figure 2:
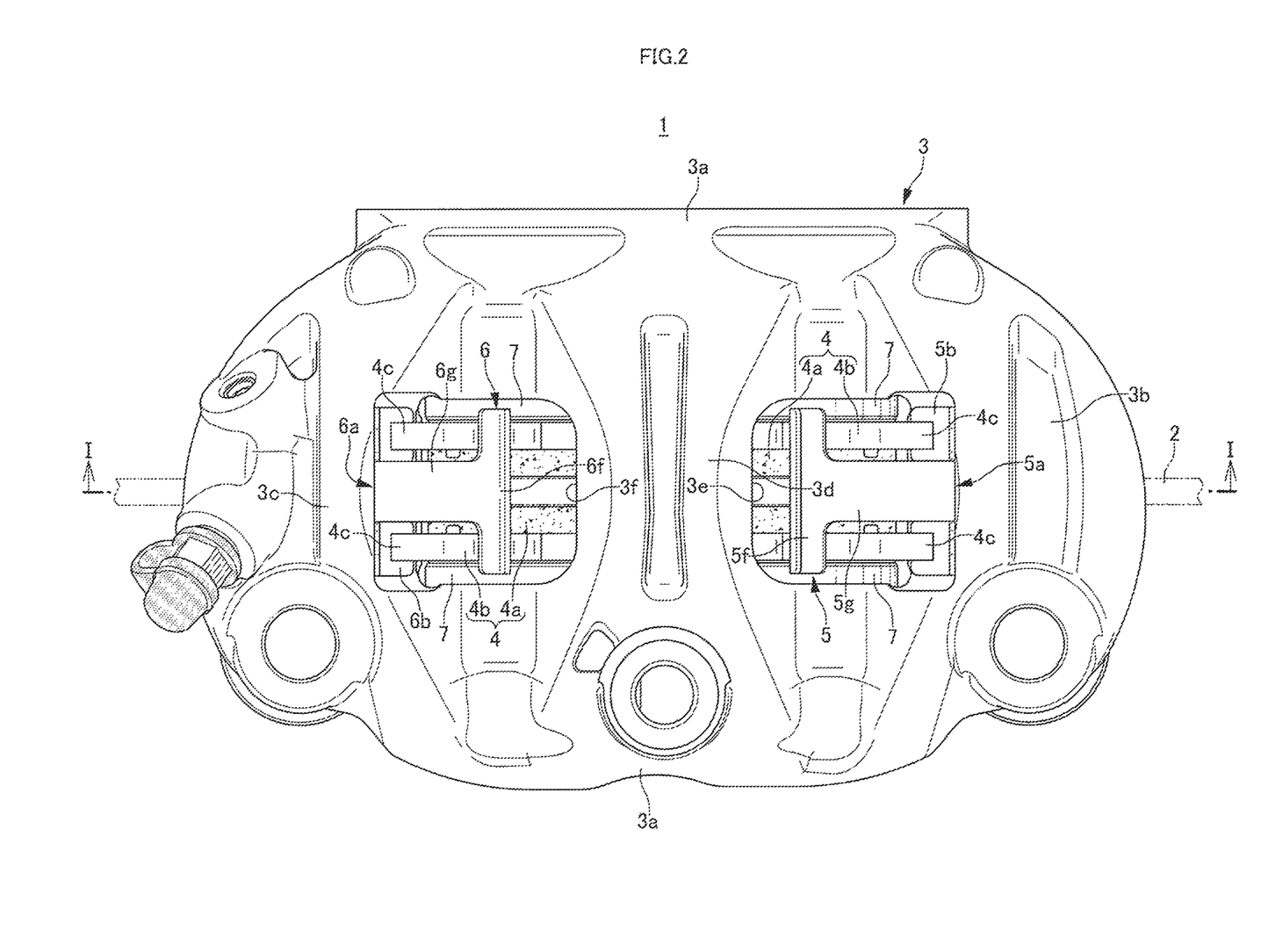
FIG. 2 is a plan view illustrating a vehicular disc brake according to an embodiment of the invention.
Figure 3:
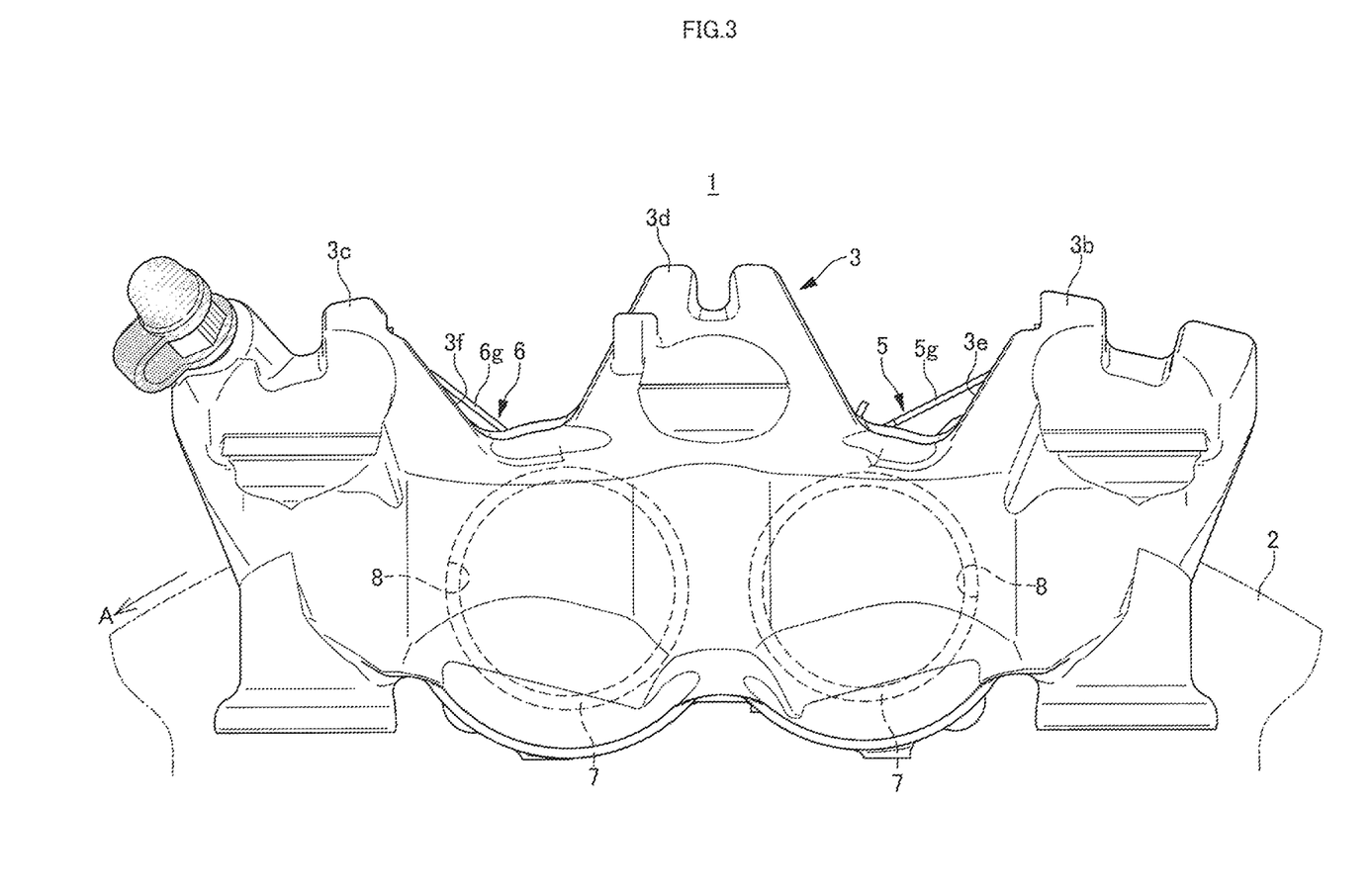
FIG. 3 is a back view illustrating the vehicular disc brake according to the embodiment of the invention.

The caliper body 3 integrally has the pair of action portions 3a and 3a, a bridge portion 3b on the disc turn-in side, a bridge portion 3c on the disc turn-out side, and a bridge portion 3d in the middle portion in the disc circumferential direction that connect the pair of action portions 3a and 3a on the disc outer peripheral side. In addition, a ceiling opening 3e on disc turn-in side is formed between the bridge portion 3b on the disc turn-in side and the bridge portion 3d in the middle portion in the disc circumferential direction and a ceiling opening 3f on the disc turn-out side is formed between the bridge portion 3c on the disc turn-out side and the bridge portion 3d in the middle portion in disc circumferential direction. Two cylinder holes 8 for accommodating pistons 7 are provided so as to face each other in each of the action portions 3a and a hydraulic chamber (not illustrated) is defined between each of the pistons 7 and each of the cylinder holes 8.

The acting portions 3a and 3a are provided with a pair of friction pad accommodating portions 3g and 3g, respectively, in which the friction pads 4 and 4 are accommodated. Each of the friction pad accommodating portions 3g and 3g has a turn-in side torque reception surface 3i formed in a position closer to the inside of the caliper body than a disc turn-in side surface 3h of the ceiling opening 3e on the disc turn-in side and closer to the disc radial inner side than the disc turn-in side surface 3h and a turn-out side torque reception surface 3k formed in a position closer to the inside of the caliper body than a disc turn-out side surface 3j of the ceiling opening 3f on the disc turn-out side and close to the disc radial inner side, and a turn-in side torque reception stepped portion 3m is formed between the disc turn-in side surface 3h and the turn-in side torque reception surface 3i and a turn-out side torque reception stepped portion 3n is formed between the disc turn-out side surface 3j and the turn-out side torque reception surface 3k.

The disc radial inner side surface in the middle portion in the disc shaft direction of the bridge portion 3b on the disc turn-in side is provided with a turn-in side attachment recessed portion 3p to which the turn-in side pad spring 5 is attached and the disc radial inner side surface in the middle portion in the disc shaft direction of the bridge portion 3c on the disc turn-out side is provided with a turn-out side attachment recessed portion 3q to which the turn-out side pad spring 6 is attached.

Figure 4:
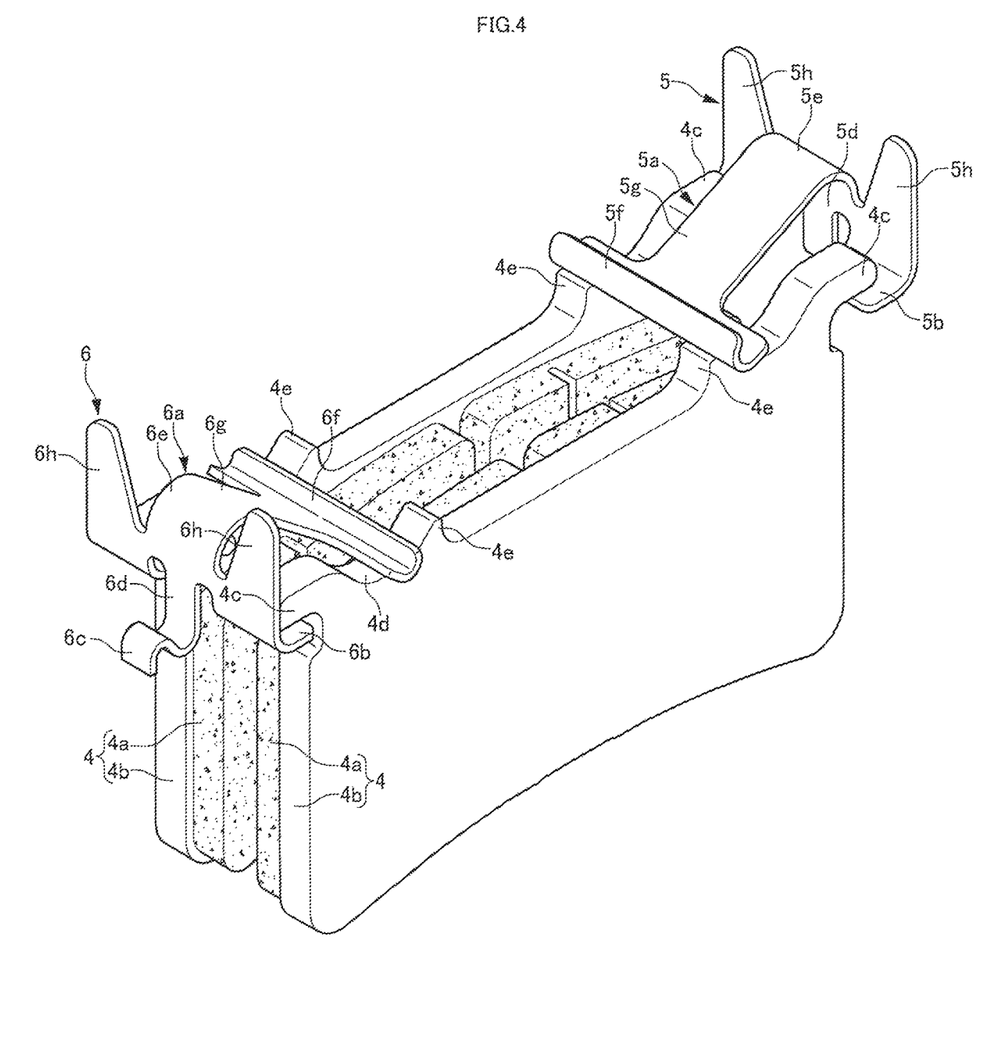
FIG. 4 is a perspective view illustrating a turn-in side pad spring, a turn-out side pad spring, and friction pads according to the embodiment of the invention.

Each of the friction pads 4 includes a lining 4a in slidable contact with the side surface of the disc rotor 2 and a back plate 4b of metal to which the lining 4a is pasted and ear pieces 4c and 4c project on the disc turn-in side and the disc turn-out side of the disc radial outer side of the back plate 4b. Furthermore, a pair of projecting pieces 4e and 4e projecting toward the disc radial outer side are formed on a disk radial outer side surface 4d of the back plate 4b and the friction pads 4 and 4 are formed symmetrically with respect to a center line CL extending in the disk radial direction.

The turn-in side pad spring 5 is attached to the turn-in side attachment recessed portion 3p formed in the bridge portion 3b on the disc turn-in side and has a turn-in side resilient portion 5a biasing the friction pads 4 and 4 to the disc radial inner side and the disc turn-out side and a turn-in side retainer portion 5b laid on the turn-in side torque reception stepped portion 3m.

The turn-in side resilient portion 5a has a turn-in side attachment portion 5c formed by convexly bending a zonal member so as to be engageable with the turn-in side attachment recessed portion 3p, a turn-in side extending piece 5d extending to the disc radial outer side of the friction pads 4 and 4 from the turn-in side attachment portion 5c, and a turn-in side resilient piece 5g folded from the projecting end portion of the turn-in side extending piece 5d toward the friction pads via a curved portion 5e so that an end portion 5f thereof makes contact with the disc turn-in side surfaces of the projecting pieces 4e and 4e of the disc turn-in side. The turn-in side resilient portion 5a further has a pair of turn-in side holding pieces 5h and 5h that project in the disc shaft direction from both sides in the middle portion of the turn-in side extending piece 5d, make contact with the disc turn-in side surface 3h of the bridge portion 3b on the disc turn-in side, and extend to the disc radial outer side of the turn-in side resilient portion 5a and the turn-in side retainer portions 5b and 5b laid on the turn-in side torque reception stepped portions 3m and 3m, respectively, are formed on the disc radial inner side of the turn-in side holding pieces 5h and 5h.

The turn-out side pad spring 6 has a turn-out side resilient portion 6a that is attached to the turn-out side attachment recessed portion 3q formed in the bridge portion 3c on the disc turn-out side and biases the friction pads 4 and 4 to the disc radial inner side and a turn-out side retainer portion 6b laid on the turn-out side torque reception stepped portion 3n.

The turn-out side resilient portion 6a has a turn-out side attachment portion 6c formed by convexly bending a zonal member so as to be engageable with the turn-out side attachment recessed portion 3q, a turn-out side extending piece 6d extending to the disc radial outer side of the friction pads 4 and 4 from the turn-out side attachment portion 6c, and a turn-out side resilient piece 6g folded from the projecting end portion of the turn-out side extending piece 6d toward the friction pads via a curved portion 6e so that an end portion 6f thereof makes contact with the disc radial outer side surfaces 4d and 4d of the back plates 4b and 4b. The turn-out side resilient portion 6a further has a pair of turn-out side holding pieces 6h and 6h that project in the disc shaft direction from both sides in the middle portion of the turn-out side extending piece 6d, make contact with the disc turn-out side surface 3j of the bridge portion 3c on the disc turn-out side, and extend to the disc radial outer side of the turn-out side resilient portion 6a and the turn-out side retainer portions 6b and 6b laid on the turn-out side torque reception stepped portions 3n and 3n, respectively, are formed on the disc radial inner side of the turn-out side holding pieces 6h and 6h.

The friction pads 4 and 4, the turn-in side pad spring 5, and the turn-out side pad spring 6 formed as described above are assembled by first engaging the turn-in side attachment portion 5c of the turn-in side pad spring 5 with the turn-in side attachment recessed portion 3p, bringing the turn-in side holding pieces 5h and 5h into contact with the disc turn-in side surface 3h of the ceiling opening 3e on the disc turn-in side, laying the turn-in side retainer portions 5b and 5b on the turn-in side torque reception stepped portions 3m and 3m, engaging the turn-out side attachment portion 6c of the turn-out side pad spring 6 with the turn-out side attachment recessed portion 3q, bringing the turn-out side holding pieces 6h and 6h into contact with the disc turn-out side surface 3j of the ceiling opening 3f on the disc turn-out side, laying the turn-out side retainer portions 6b and 6b on the turn-out side torque reception stepped portions 3n and 3n, and then causing the turn-in side torque reception stepped portion 3m and the turn-out side torque reception stepped portion 3n to support the ear pieces 4c and 4c of the friction pads 4 and 4 via the turn-in side retainer portion 5b and the turn-out side retainer portion 6b.

This assembly causes the friction pads 4 and 4 to be disposed in the friction pad accommodating portions so as to be movable in the disc shaft direction along the turn-in side torque reception stepped portion 3m and the turn-out side torque reception stepped portion 3n via the ear pieces 4c and 4c and a braking torque can be received by the turn-in side torque reception surface 3i, the turn-out side torque reception surface 3k, the turn-in side torque reception stepped portion 3m, and the turn-out side torque reception stepped portion 3n. In addition, since the end portion 5f of the turn-in side resilient piece 5g of the turn-in side pad spring 5 makes contact with the disc turn-in side surfaces of the projecting pieces 4e and 4e on the turn-in side of the friction pads 4 and the end portion 6f of the turn-out side resilient piece 6g of the turn-out side pad spring 6 makes contact with the disc radial outer side surfaces 4d and 4d of the friction pads 4, the friction pads 4 and 4 are biased to the disc turn-out side and the disc radial inner side by the turn-in side pad spring 5 and biased to the disc radial inner side by the turn-out side pad spring 6.

Since the turn-in side resilient piece 5g of the turn-in side pad spring 5 and the turn-out side resilient piece 6g of the turn-out side pad spring 6 bias the friction pads 4 and 4 to the disc radial inner side as described above in the embodiment, it is possible to suppress the rattling of the friction pads 4 and 4 in the disc radial direction due to vibrations during travel or the like. In addition, since the turn-in side resilient piece 5g biases the friction pads 4 and 4 to the disc turn-out side and a disc turn-out side surface 4f of the back plate 4b is in contact with the turn-out side torque reception surface 3k in advance, the rattling of the friction pads 4 and 4 during braking can be suppressed. In addition, even when the turn-in side retainer portion 5b of the turn-in side pad spring 5 and the turn-out side retainer portion 6b of the turn-out side pad spring 6 move the friction pads 4 and 4 in the disc shaft direction, the wear of the turn-in side torque reception stepped portion 3m and the turn-out side torque reception stepped portion 3n of the caliper body 3 can be suppressed.

In addition, since the turn-in side pad spring 5 is attached to the disc turn-in side of the friction pad accommodating portion 3g of the bridge portion 3b on the disc turn-in side and the turn-out side pad spring 6 is attached to the disc turn-out side of the friction pad accommodating portion of the bridge portion 3c on the disc turn-out side, the clearance between the bridge portion 3d in the middle portion in the disc circumferential direction and the friction pads 4 and 4 can be small and there is no risk that the size of the caliper body 3 is increased. In addition, since the turn-in side pad spring 5 and the turn-out side pad spring 6 are attached so that the turn-in side pad spring 5 is engaged with the turn-in side attachment recessed portion 3p formed in the bridge portion 3b on the disc turn-in side and the turn-out side pad spring 6 is engaged with the turn-out side attachment recessed portion 3q formed in the bridge portion 3c on the disc turn-out side, respectively, the turn-in side pad spring 5 and the turn-out side pad spring 6 can be attached without increasing the thicknesses of the bridge portions 3b and 3c and there is no risk that the weight of the caliper body 3 is increased.

Since the friction pads 4 and 4 are formed symmetrically with respect to the center line CL extending in the disc radial direction, the friction pads 4 and 4 can be formed in the same shape, thereby achieving cost reduction. In addition, the turn-in side pad spring 5 makes contact with the disc turn-in side surface 3h of the ceiling opening 3e and has the turn-in side holding piece 5h extending to the disc radial outer side of the turn-in side resilient portion 5a, and the turn-out side pad spring 6 makes contact with the disc turn-out side surface 3j of the ceiling opening 3f and has the turn-out side holding piece 6h extending to the disc radial outer side of the turn-out side resilient piece 6g. Accordingly, when the friction pads 4 and 4 are assembled after the turn-in side pad spring 5 and the turn-out side pad spring 6 are assembled to the caliper body 3, the turn-in side pad spring 5 and the turn-out side pad spring 6 can be held in a stable state, thereby improving assemblability.

It should be noted here that the invention is not limited to the above embodiment in which the friction pads are formed symmetrically with respect to the center line CL extending in the disc radial direction and the projecting pieces with which the turn-in side resilient piece of the turn-in side pad spring makes contact may be provided only on the disc turn-in side and, in this case, the turn-in side pad spring and the turn-out side pad spring can be formed in the same shape. In addition, the ceiling opening may be formed in any shape and the bridge portion may have only one ceiling opening. In addition, the invention is applicable to a 2-pot opposed-piston caliper body and an opposed-piston caliper body with six or more pots and also applicable to a separate type caliper body in addition to an integral type caliper body.

REFERENCE SIGNS LIST

1: vehicular disc brake
2: disc rotor
3: caliper body
3a: action portion
3b, 3c, 3d: bridge portion
3e, 3f: ceiling opening
3g: friction pad accommodating portion
3h: disc turn-in side surface
3i: turn-in side torque reception surface
3j: disc turn-out side surface
3k: turn-out side torque reception surface
3m: turn-in side torque reception stepped portion
3n: turn-out side torque reception stepped portion
3p: turn-in side attachment recessed portion
3q: turn-out side attachment recessed portion
4: friction pad
4a: lining
4b: back plate
4c: ear piece
4d: disc radial outer side surface
4e: projecting piece
4f: disc turn-out side surface
5: turn-in side pad spring
5a: turn-in side resilient portion
5b: turn-in side retainer portion
5c: turn-in side attachment portion
5d: turn-in side extending piece
5e: curved portion
5f: end portion
5g: turn-in side resilient piece
5h: turn-in side holding piece
6: turn-out side pad spring
6a: turn-out side resilient portion
6b: turn-out side retainer portion
6c: turn-out side attachment portion
6d: turn-out side extending piece
6e: curved portion
6f: end portion
6g: turn-out side resilient piece
6h: turn-out side holding piece
7: piston
8: cylinder hole

The invention claimed is:

1. A vehicular disc brake in which a caliper body is formed by connecting, via a bridge portion straddling an outer periphery of a disc rotor, a pair of action portions facing each other with the disc rotor sandwiched therebetween, the action portions are provided with a pair of friction pad accommodating portions that accommodate a pair of friction pads disposed with the disc rotor sandwiched therebetween, ear pieces project on a disc turn-in side and a disc turn-out side in vehicle forward movement on a disc radial outer side of each of the friction pads, and torque reception stepped portions are formed on the disc radial outer side of each of the friction pad accommodating portions, the torque reception stepped portions supporting the ear pieces so that the ear pieces are movable in a disc shaft direction, the vehicular disc brake further comprising:

a turn-in side pad spring that has a turn-in side resilient portion attached to a part of the bridge portion on the disc turn-in side in vehicle forward movement of the friction pad accommodating portions, the turn-in side resilient portion biasing the friction pads to a disc radial inner side and the disc turn-out side, and a turn-in side retainer portion laid on one of the torque reception stepped portions on the disc turn-in side; and a turn-out side pad spring that has a turn-out side resilient portion attached to a part of the bridge portion on the disc turn-out side in vehicle forward movement of the friction pad accommodating portions, the turn-out side resilient portion biasing the friction pads to the disc radial inner side, and a turn-out side retainer portion laid on the other of the torque reception stepped portions on the disc turn-out side.

2. A vehicular disc brake in which a caliper body is formed by connecting, via a bridge portion straddling an outer periphery of a disc rotor, a pair of action portions facing each other with the disc rotor sandwiched therebetween, the action portions are provided with a pair of friction pad accommodating portions that accommodate a pair of friction pads disposed with the disc rotor sandwiched therebetween, ear pieces project on a disc turn-in side and a disc turn-out side in vehicle forward movement on a disc radial outer side of each of the friction pads, and torque reception stepped portions are formed on the disc radial outer side of each of the friction pad accommodating portions, the torque reception stepped portions supporting the ear pieces so that the ear pieces are movable in a disc shaft direction, the vehicular disc brake further comprising:

a turn-in side pad spring that has a turn-in side resilient portion attached to a part of the bridge portion on the disc turn-in side in vehicle forward movement of the friction pad accommodating portions, the turn-in side resilient portion biasing the friction pads to a disc radial inner side and the disc turn-out side, and a turn-in side retainer portion laid on one of the torque reception stepped portions on the disc turn-in side; and a turn-out side pad spring that has a turn-out side resilient portion attached to a part of the bridge portion on the disc turn-out side in vehicle forward movement of the friction pad accommodating portions, the turn-out side resilient portion biasing the friction pads to the disc radial inner side, and a turn-out side retainer portion laid on the other of the torque reception stepped portions on the disc turn-out side, wherein each of the friction pads has a pair of projecting pieces projecting toward the disc radial outer side on the disc radial outer surface, the friction pads being formed symmetrically with respect to a center line extending in a disc radial direction, the turn-in side resilient portion has a turn-in side attachment portion to be attached to a disc radial inner side surface of the bridge portion, a turn-in side extending piece extending to the disc radial outer side of the friction pads from the turn-in side attachment portion, and a turn-in side resilient piece that is folded toward the friction pads via a curved portion from a projecting end portion of the turn-in side extending piece and has an end portion in contact with disc turn-in side surfaces of the projecting pieces on the disc turn-in side, and the turn-out side resilient portion has a turn-out side attachment portion to be attached to the disc radial inner side surface of the bridge portion, a turn-out side extending piece extending to the disc radial outer side of the friction pads from the turn-out side attachment portion, and a turn-out side resilient piece that is folded toward the friction pads via a curved portion from a projecting end portion of the turn-out side extending piece and has an end portion in contact with the disc radial outer side surfaces of the friction pads.

3. A vehicular disc brake in which a caliper body is formed by connecting, via a bridge portion straddling an outer periphery of a disc rotor, a pair of action portions facing each other with the disc rotor sandwiched therebetween, the action portions are provided with a pair of friction pad accommodating portions that accommodate a pair of friction pads disposed with the disc rotor sandwiched therebetween, ear pieces project on a disc turn-in side and a disc turn-out side in vehicle forward movement on a disc radial outer side of each of the friction pads, and torque reception stepped portions are formed on the disc radial outer side of each of the friction pad accommodating portions, the torque reception stepped portions supporting the ear pieces so that the ear pieces are movable in a disc shaft direction, the vehicular disc brake further comprising:

a turn-in side pad spring that has a turn-in side resilient portion attached to a part of the bridge portion on the disc turn-in side in vehicle forward movement of the friction pad accommodating portions, the turn-in side resilient portion biasing the friction pads to a disc radial inner side and the disc turn-out side, and a turn-in side retainer portion laid on one of the torque reception stepped portions on the disc turn-in side; and a turn-out side pad spring that has a turn-out side resilient portion attached to a part of the bridge portion on the disc turn-out side in vehicle forward movement of the friction pad accommodating portions, the turn-out side resilient portion biasing the friction pads to the disc radial inner side, and a turn-out side retainer portion laid on the other of the torque reception stepped portions on the disc turn-out side, wherein the bridge portion is provided with a ceiling opening, the friction pad accommodating portions are formed on the disc radial inner side of the ceiling opening, the turn-in side pad spring has a turn-in side holding piece that makes contact with a disc turn-in side surface of the ceiling opening and extends to the disc radial outer side of the turn-in side resilient portion and the turn-in side retainer portion is formed on the disc radial inner side of the turn-in side holding piece, and the turn-out side pad spring has a turn-out side holding piece that makes contact with a disc turn-out side surface of the ceiling opening and extends to the disc radial outer side of the turn-out side resilient portion and the turn-out side retainer portion is formed on the disc radial inner side of the turn-out side holding piece.

\* \* \* \* \*